(12) United States Patent
Mino et al.

(10) Patent No.: US 7,794,873 B2
(45) Date of Patent: Sep. 14, 2010

(54) BATTERY INCLUDING STRIP-SHAPED ELECTRODE GROUP FOLDED IN A ZIGZAG PATTERN

(75) Inventors: Shinji Mino, Osaka (JP); Sadayuki Okazaki, Osaka (JP); Masaya Ugaji, Osaka (JP); Masayoshi Hiramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 315 days.

(21) Appl. No.: 11/910,603

(22) PCT Filed: Apr. 21, 2006

(86) PCT No.: PCT/JP2006/308422

§ 371 (c)(1),
(2), (4) Date: Oct. 3, 2007

(87) PCT Pub. No.: WO2006/118053

PCT Pub. Date: Nov. 9, 2006

(65) Prior Publication Data

US 2009/0053592 A1 Feb. 26, 2009

(30) Foreign Application Priority Data

Apr. 26, 2005 (JP) .............................. 2005-128395

(51) Int. Cl.
*H01M 2/26* (2006.01)
*H01M 2/02* (2006.01)

(52) U.S. Cl. ....................... 429/161; 429/178

(58) Field of Classification Search ........................ None
See application file for complete search history.

(56) References Cited

U.S. PATENT DOCUMENTS 5,300,373 A 4/1994 Shackle (Continued)

FOREIGN PATENT DOCUMENTS

JP 05101830 4/1993

(Continued)

OTHER PUBLICATIONS

PCT International Search Report dated Aug. 1, 2005.

*Primary Examiner*—Dah-Wei D Yuan
*Assistant Examiner*—Adam A Arciero
(74) *Attorney, Agent, or Firm*—Dickinson Wright PLLC (57) ABSTRACT

A battery of the present invention has a strip-shaped electrode group. The electrode group includes a first electrode, a second electrode, and a separator interposed therebetween. The first electrode has a strip-shaped first current collector and a first active material layer carried on one surface thereof. The first active material layer faces the separator. The second electrode has a strip-shaped second current collector and a second active material layer carried on one surface thereof. The second active material layer faces the separator. The electrode group is folded in a zigzag pattern to form a laminate having a plurality of flat portions, at least one first bent portion located on a first end side of the plurality of flat portions in which the first current collector is located on the outermost side, and at least one second bent portion located on a second end side that is opposite to the first end side in which the second current collector is located on the outermost side. The laminate has a first terminal connected to the at least one first bent portion and a second terminal connected to the at least one second bent portion.

6 Claims, 4 Drawing Sheets

U.S. PATENT DOCUMENTS 5,925,482 A  7/1999  Yamashita

FOREIGN PATENT DOCUMENTS

| | | |
|---|---|---|
| JP | 06140077 | 5/1994 |
| JP | 07099048 | 4/1995 |
| JP | 8501409 | 2/1996 |
| JP | 08264206 | 10/1996 |
| JP | 09007610 | 1/1997 |
| JP | 09134735 | 5/1997 |
| JP | 2003272593 | 9/2003 |
| JP | 2003272594 | 9/2003 |
| JP | 2006032874 | 2/2006 |

BATTERY INCLUDING STRIP-SHAPED ELECTRODE GROUP FOLDED IN A ZIGZAG PATTERN

TECHNICAL FIELD

The present invention relates to a battery including a positive electrode, a negative electrode and a separator, and more particularly to a battery that can be made small and has a higher energy density.

BACKGROUND ART

Figure 6:
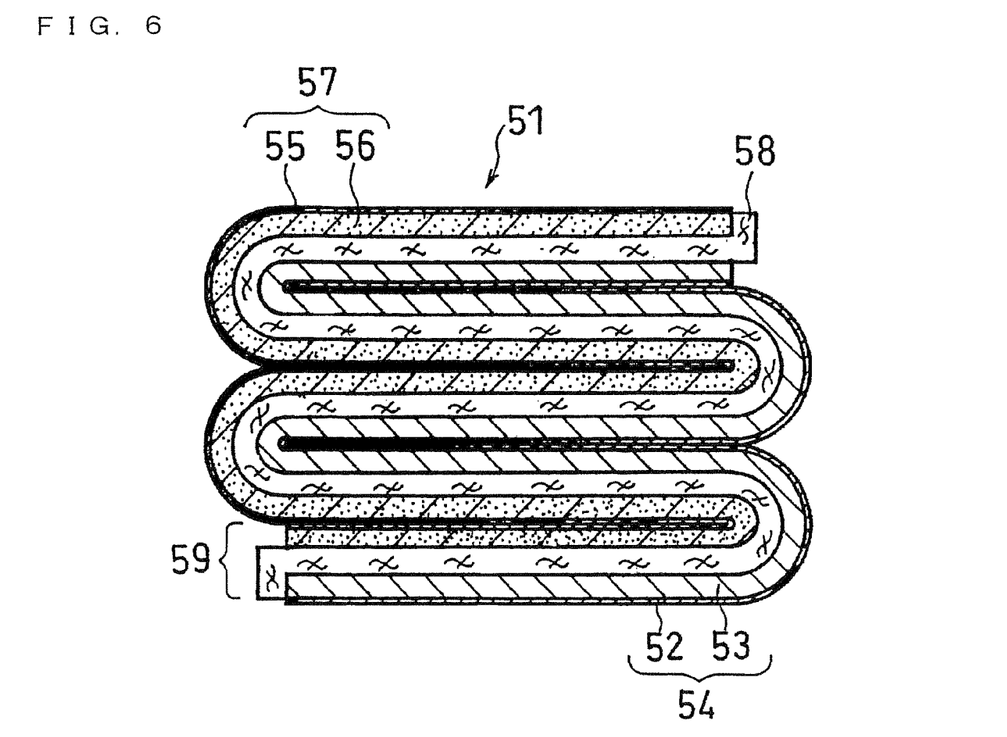
FIG. 6 is a vertical cross sectional view schematically showing a conventional laminated battery.

With an increase in demand for portable mobile terminal equipment, batteries having a flat shape and a high energy density are required. For example, in order to increase efficiency in housing batteries into battery cases, a laminate as shown in FIG. 6 that includes a positive electrode, a negative electrode and a separator is proposed (see Patent Documents 1 and 2). The laminate 51 of FIG. 6 is formed by folding an electrode group 59 including a positive electrode 54, a negative electrode 57 and a separator 58 interposed therebetween in a zigzag pattern. The positive electrode 54 includes a positive electrode current collector 52 made of an aluminum foil, and a positive electrode active material layer 53 made of a lithium composite oxide, such as $LiCoO_2$, which is carried on the positive electrode current collector 52. The negative electrode 57 includes a negative electrode current collector 55 made of a copper foil, and a negative electrode active material layer 56 made of a carbonaceous material which is carried on the negative electrode current collector 55.

In the battery described in Patent Document 1, a region carrying no active material is formed in at least one of the positive electrode current collector and the negative electrode current collector, and that region can be used as a bent portion of the laminate. In this case, because neither the positive electrode active material layer nor the negative electrode active material layer is present in the bent portion, the bent portion is thin. This allows the laminate to have a uniform thickness.

Figure 7:
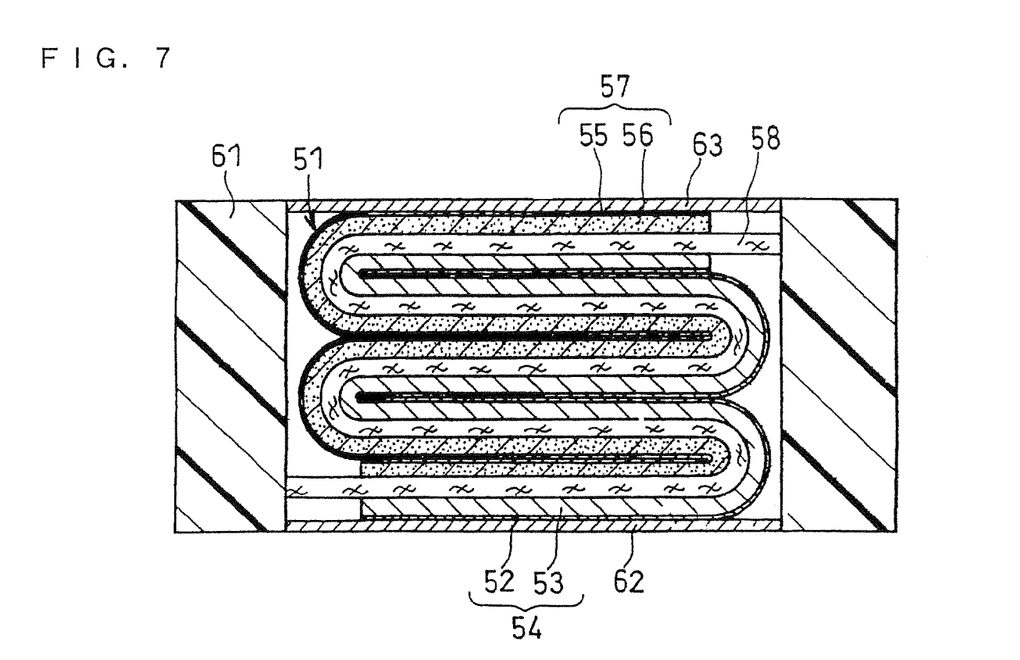
FIG. 7 is a vertical cross sectional view schematically showing Comparative Battery 1 produced in an example.

Also, a battery configured as shown in FIG. 7 is proposed (see Patent Document 3). In the battery of FIG. 7, a laminate 51 as shown in FIG. 6 is also used. An electrically insulating sealant 61 is arranged around the laminate 51. A conductive plate member 62 is disposed such that it is in contact with the positive electrode current collector 52 located on the undersurface of the laminate. The conductive plate member 62 serves as a positive electrode terminal. Similarly, a conductive plate member 63 is disposed such that it is in contact with the negative electrode current collector 55 located on the upper surface of the electrode group. The conductive plate member 63 serves as a negative electrode terminal.

Patent Document 1: Japanese Laid-Open Patent Publication No. Hei 9-7610
Patent Document 2: Japanese Laid-Open Patent Publication No. Hei 8-264206
Patent Document 3: Japanese Laid-Open Patent Publication No. Hei 6-140077

DISCLOSURE OF THE INVENTION

Problem to be Solved by the Invention

However, in order to solder a battery configured as above to a circuit substrate, lead terminals are additionally required. For this reason, the battery itself cannot be made small. Further, a mounting area larger than the cross-sectional area of the battery itself is required. Also, the height of the battery will be large. Accordingly, the miniaturization of the circuit substrate is difficult to achieve.

Furthermore, because the number of components increases, it will lead to an increase in cost.

In order to achieve a higher capacity by increasing the rate of the active material layers in the electrode group, a reduction in thickness of the positive electrode current collector and the negative electrode current collector is conceived. However, if the thickness of a current collector is decreased to less than 5 µm, it will be difficult to weld a lead terminal to the current collector. If a current collector is thin, the handling will be difficult, so it will be difficult to form a lead terminal without causing damage to the current collector.

It is an object of the present invention to form a lead terminal without causing damage to a current collector even when the current collector is thin, and to provide a highly reliable thin battery.

Means for Solving the Problem

The battery of the present invention has a strip-shaped electrode group. The electrode group includes a first electrode, a second electrode, and a separator interposed therebetween. The first electrode has a strip-shaped first current collector and a first active material layer carried on one surface of the first current collector. The first active material layer faces the separator. The second electrode has a strip-shaped second current collector and a second active material layer carried on one surface of the second current collector. The second active material layer faces the separator. The electrode group is folded in a zigzag pattern to form a laminate having a plurality of flat portions, at least one first bent portion located on a first end side of the plurality of flat portions in which the first current collector is located on the outermost side, and at least one second bent portion located on a second end side that is opposite to the first end side in which the second current collector is located on the outermost side. The laminate has a first terminal connected to the at least one first bent portion and a second terminal connected to the at least one second bent portion.

In other words, the battery of the present invention is folded in a zigzag pattern. Specifically, a separator is folded such that open portions are directed opposite one another, forming first electrode housing portions and second electrode housing portions which are arranged alternately and have a U-shape in cross section. In the first electrode housing portion, a first electrode is housed. In the second electrode housing portion, a second electrode is housed. The first electrode includes two first electrode pieces, each first electrode piece having a first current collector and a first active material layer carried on one surface of the first current collector. The second electrode includes two second electrode pieces, each second electrode piece having a second current collector and a second active material layer carried on one surface of the second current collector. The two first electrode pieces are disposed in the first electrode housing portion such that the active material layer is in contact with the separator, and the two second electrode pieces are disposed in the second electrode housing portion such that the active material layer is in contact with the separator. The two adjacent first electrode pieces that are housed in the first electrode housing portion and whose active material layers face each other are connected to a first connecting portion provided such that it straddles the separator between the first electrode housing portions. The two adjacent second electrode pieces that are housed in the second electrode housing portion and whose active material layers face each other are connected to a second connecting portion provided such that it straddles the separator between the second electrode housing portions. The first connecting portion is formed of at least the first current collector, and the second connecting portion is formed of at least the second current collector. The battery of the present invention further includes a first terminal portion that connects the first connecting portions to each other, and a second terminal portion that connects the second connecting portions to each other.

A plurality of the bent portions can be formed on each of the first end side and the second end side, and, on at least one of the first end side and the second end side, the bent portions may be displaced sequentially in a predetermined direction perpendicular to the thickness direction of the laminate. Alternatively, on at least one of the first end side and the second end side, every other one of the bent portions may be protruded in a predetermined direction perpendicular to the thickness direction of the laminate. As used herein, "the thickness direction of the laminate" refers to a direction in which the flat portions are laminated.

It is preferable that, in at least one of the first bent portion and the second bent portion, the current collector does not carry the active material layer. Also, it is preferable that, in at least one bent portion, irregularities are formed on the surface of the current collector.

Effect of the Invention

In the laminate included in the battery of the present invention, at least one first bent portion and at least one second bent portion are provided on a first end side and a second end side of the flat portions, respectively. On the outermost side of the first bent portion, the first current collector is located, and on the outermost side of the second bent portion, the second current collector is located. Further, the laminate has a first terminal connected to the at least one first bent portion and a second terminal connected to the at least one second bent portion. Accordingly, even when the current collectors have a small thickness, by connecting an additional lead terminal to these terminals, current collection is possible.

Because the first terminal and the second terminal are formed on the side faces of the laminate, it is possible to provide a battery that is free from an increase in thickness resulting from the provision of terminals.

Furthermore, by connecting the terminal to all of the entire bent portions, even if part of the terminal loses contact with the current collector, the remaining part of the terminal remains in contact with the current collector. Therefore, it is possible to provide a highly reliable battery.

BEST MODE FOR CARRYING OUT THE INVENTION

Embodiment 1

Figure 1:
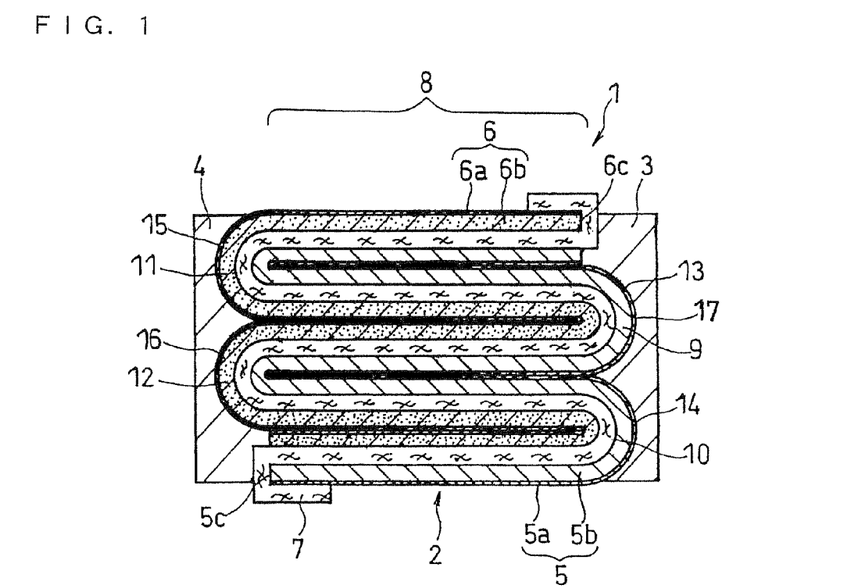
FIG. 1 is a vertical cross sectional view schematically showing a power generating unit included in a battery according to one embodiment of the present invention.

FIG. 1 shows a power generating unit included in a battery according to an embodiment of the present invention.

The power generating unit 1 of FIG. 1 includes a laminate 2, and a first terminal 3 and a second terminal 4 which are provided to the laminate 2. The laminate includes a plurality of flat portions 8, first bent portions 9 and 10 located on a first end side of the plurality of flat portions 8 in which a first current collector 5a is located on the outermost side, and second bent portions 11 and 12 located on a second end side that is opposite to the first end side in which a second current collector 6a is located on the outermost side.

The laminate is formed by folding a strip-shaped electrode group in a zigzag pattern. The strip-shaped electrode group includes a first electrode 5, a second electrode 6, and a separator 7 interposed therebetween. The first electrode 5 has the strip-shaped first current collector 5a and a first active material layer 5b carried on one surface of the current collector. The second electrode 6 has the strip-shaped second current collector 6a and a second active material layer 6b carried on one surface of the current collector. The first active material layer 5b and the second active material layer 6b face each other with the separator interposed therebetween.

Either of the first electrode and the second electrode can serve as a positive or negative electrode.

In the end face (first end face) of the laminate on the first end side, the first bent portions 9 and 10 are located. In the end face (second end face) on the second end side that is opposite to the first end side, second bent portions 11 and 12 are located. On the outermost side of the first bent portions 9 and 10, bent portions 13 and 14 of the first current collector are located. On the outermost side of the second bent portions 11 and 12, bent portions 15 and 16 of the second current collector are located. Thereby, the first current collector 5a is provided on the first end face of the laminate in which the first bent portions 9 and 10 are disposed. Likewise, the second current collector 6a is provided on the second end face of the laminate in which the second bent portions 11 and 12 are disposed. In the power generating unit of FIG. 1, the first bent portions and the second bent portions are formed of an electrode including a current collector and an active material layer carried on the current collector and a separator.

The laminate has a first terminal 3 connected to the first bent portions 9 and 10, and a second terminal 4 connected to the second bent portions 11 and 12. In other words, the laminate has the first terminal 3 on the first end face in which the bent portions of first current collector 13 and 14 are disposed, and the second terminal 4 on the second end face in which the bent portions of second current collector 15 and 16 are disposed.

As described, by providing the first terminal 3 on the first end face in which the bent portions of first current collector are disposed, and the second terminal 4 on the second end face in which the bent portions of second current collector are disposed, a lead terminal can be attached to these terminals. Accordingly, even when the current collectors are thin films, lead terminals can be connected without causing damage to the current collectors.

According to a conventional technique, the terminals are disposed in the thickness direction of the laminate, and therefore the resulting laminate has a large thickness. However, according to the present invention, the first terminal and the second terminal are provided on the first end face and the second end face that are located on the side faces of the laminate, respectively, the thickness of the laminate is not increased. As used herein, "the thickness direction of the laminate" refers to a laminating direction of the plurality of flat portions. The phrase "the side faces of the laminate" refers to end faces that are parallel to the thickness direction of the laminate.

The battery having such a power generating unit can be mounted easily on a circuit substrate or the like.

In FIG. 1, the first terminal is connected to both first bent portions 9 and 10, and the second terminal is connected to both second bent portions 11 and 12. It is preferable that each terminal is provided over the entire two bent portions as shown in FIG. 1. Thereby, even if the electrical connection between the current collector and the terminal is partially lost, or even if the current collector of a bent portion is damaged, it is possible to collect current from the first and second terminals. Accordingly, a highly reliable battery can be obtained. Preferably, the first terminal and the second terminal are formed such that they cover the entire first end face and the entire second end face, respectively.

When there is only one bent portion in each end face, it is preferable that each terminal is provided over the entire bent portion.

The thickness of the first terminal is preferably, for example, not less than 5 μm from an apex 17 of first bent portion. This applies to the second terminal.

In the above-described laminate, the first end face and the second end face are opposite each other. This prevents the first terminal and the second terminal to come into contact with each other.

The first terminal and the second terminal can be formed of a conductive layer. For example, the first terminal and the second terminal can be formed of a metal film. As the materials for the first terminal and the second terminal, any material known in the pertinent art can be used. For example, when the first terminal serves as a positive electrode terminal, as the material for the first terminal, for example, aluminum can be used. When the second terminal serves as a negative electrode terminal, as the material for the second terminal, for example, copper can be used.

The first terminal and the second terminal can be formed by, for example, arc spraying using a material as described above.

It is also possible to form conductive layers by applying conductive pastes onto the first end face and the second end face, followed by drying, and use the conductive layers as the first terminal and the second terminal.

In the upper portion of the power generating unit of FIG. 1, the separator 7 is folded back at the end portion 6c of the second electrode 6, and extends over the current collector 6a of the second electrode 6. Because the separator is present between the second electrode 6 and the first terminal 3, short-circuiting does not occur between the second electrode 6 and the first terminal 3.

Similarly, in the lower portion of the power generating unit, the separator 7 is folded back at the end portion 5c of the first electrode 5, and extends over the current collector 5a of the first electrode 5. Because the separator is present between the first electrode 5 and the second terminal 4, short-circuiting does not occur between the first electrode 5 and the second terminal 4.

The positive electrode active material and the negative electrode active material can be selected appropriately according to the type of battery produced. For example, in the case of a lithium secondary battery, as the positive electrode active material, any material known in the pertinent art can be used such as lithium cobalt oxide ($LiCoO_2$). As the negative electrode active material, any material known in the pertinent art can be used such as metallic lithium, graphite, silicon (Si), silicon oxide ($SiO_x$) or tin (Sn). The negative electrode active material layer may be a deposited film of Si, $SiO_x$ or Sn.

The positive electrode active material layer and the negative electrode active material layer may further include a binder, a conductive material and the like where necessary.

As the positive electrode current collector and the negative electrode current collector, for example, sheets made of a metal material known in the pertinent art can be used. As the material for the positive electrode current collector, for example, aluminum can be used. As the material for the negative electrode current collector, for example, copper can be used.

An example of a method for producing the power generating unit of FIG. 1 will be described below. In the following description, the first electrode serves as a positive electrode, and the second electrode serves as a negative electrode.

The positive electrode is produced by forming a positive electrode active material layer on one surface of a positive electrode current collector. As the method for producing the positive electrode active material layer, any method known in the pertinent art can be used. The method for producing the positive electrode active material layer can be selected appropriately according to the type of battery produced and the type of positive electrode active material used.

This applies to the method for producing the negative electrode.

Subsequently, the obtained positive and negative electrodes are laminated with a separator interposed therebetween to obtain an electrode group. When laminating, the positive electrode active material layer and the negative electrode active material layer are allowed to face each other with the separator interposed therebetween.

The obtained electrode group is then folded in a zigzag pattern to obtain a laminate having a plurality of flat portions, at least one first bent portion located on the first end side of the plurality of flat portions in which the first current collector is located on the outermost side, and at least one second bent portion located on the second end side that is opposite to the first end side in which the second current collector is located on the outermost side.

This laminate has a first end face in which the first current collector is provided, and a second end face in which the second current collector is provided. In such a laminate, the second end face is located opposite to the first end face.

Subsequently, a first terminal (positive electrode terminal) connected to at least one first bent portion is provided in the first end face, and a second terminal (negative electrode terminal) connected to at least one second bent portion is provided in the second end face.

Thereby, the power generating unit as shown in FIG. 1 can be produced.

Embodiment 2

Figure 2:
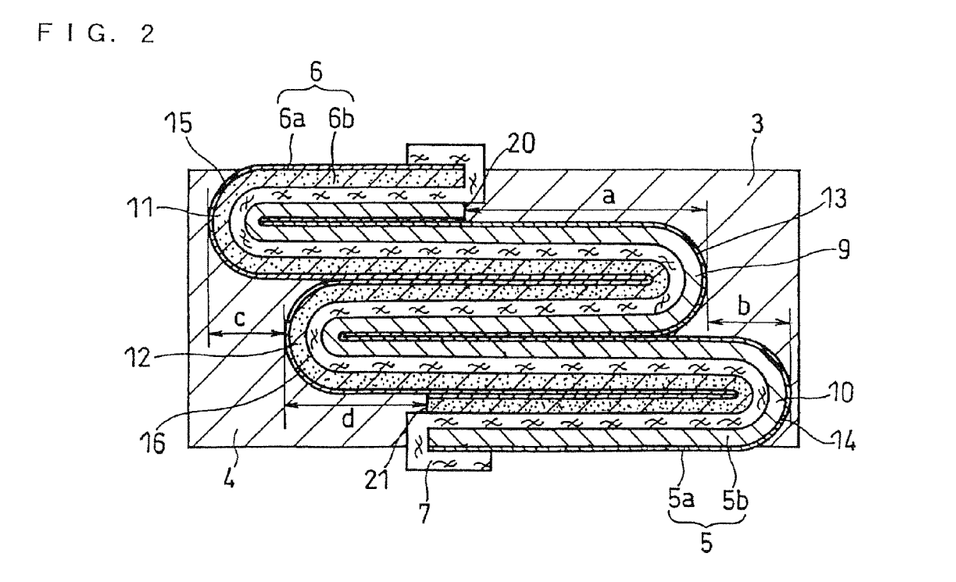
FIG. 2 is a vertical cross sectional view schematically showing a power generating unit included in a battery according to another embodiment of the present invention.
Figure 3:
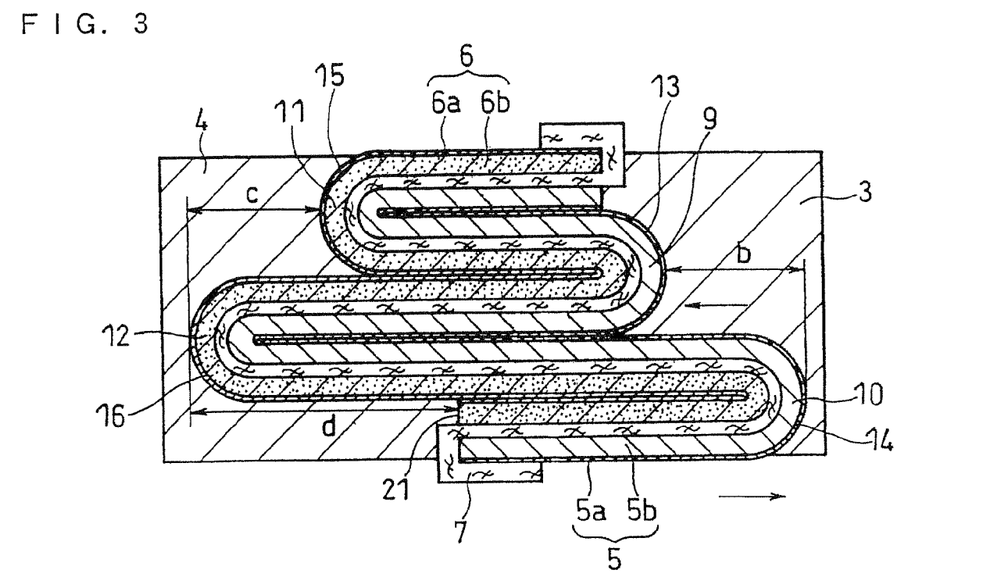
FIG. 3 is a vertical cross sectional view schematically showing a power generating unit included in a battery according to still another embodiment of the present invention.

When two or more bent portions are included in each of the first end face and the second end face of the laminate, it is preferable that, in at least one of the first end face and the second end face, the bent portions are displaced. The bent portions may be displaced sequentially in a predetermined direction perpendicular to the thickness direction of the laminate, or every other one of the bent portions may be protruded in a predetermined direction perpendicular to the thickness direction of the laminate. In other words, a plurality of bent portions may be displaced gradually in one direction from the endmost bent portion on one side toward the other endmost bent portion on the other side. Alternatively, the plurality of bent portions may be displaced alternately in one direction and in the opposite direction from the endmost bent portion on one side toward the other endmost bent portion on the other side. This will be described with reference to FIGS. 2 to 3. In FIGS. 2 and 3, the same reference numerals are given to the same components as those of FIG. 1.

FIG. 2 shows a laminate in which the first bent portions and the second bent portions are displaced in the same direction. The apex of the bent portion 9 located on the first end side of the flat portions (i.e., the apex of the bent portion 13 of first current collector) and the end portion 20 of the electrode group located in the upper portion of the laminate are displaced by a length "a". The apex of the bent portion 9 and the apex of the bent portion 10 adjacent to the bent portion 9 (i.e., the apex of the bent portion 14 of first current collector) are displaced by a length "b".

Similarly, the apex of the bent portion 12 located on the second end side of the flat portions (i.e., the apex of the bent portion 16 of second current collector) and the end portion 21 of the electrode group located in the lower portion of the laminate are displaced by a length "d". The apex of the bent portion 12 and the apex of the bent portion 11 adjacent to the bent portion 12 (i.e., the apex of the bent portion 15 of second current collector) are displaced by a length "c".

FIG. 3 shows a laminate in which the bent portions are displaced alternately in one direction and in the opposite direction. In the laminate of FIG. 3, every other one of the bent portions is protruded in a direction perpendicular to the thickness direction of the laminate.

In the first end side of the flat portions, the bent portion 10 is displaced in a predetermined direction (the direction indicated by the single-headed arrow pointing to the right in FIG. 3) from the bent portion 10 of the laminate of FIG. 1. Also, the end portion 21 of the electrode group located in the lower portion of the laminate is displaced in the same direction as the second bent portion 10.

The bent portion 9 is displaced in a direction (the direction indicated by the single-headed arrow pointing to the left in FIG. 3) opposite to the direction in which the bent portion 10 is displaced. The apex of the bent portion 9 is displaced toward the left from the apex of the bent portion 10 by a length "b".

In the second end side of the flat portions, the bent portion 12 is displaced in the same direction as the bent portion 9. The bent portion 11 is displaced in a direction opposite to the direction in which the bent portion 12 is displaced. In FIG. 3, the apex of the bent portion 12 is displaced toward the left from the end portion 21 of the electrode group by a length "d". The apex of the bent portion 11 is displaced toward the right from the apex of the bent portion 12 by a length "c".

The lengths "a", "b", "c" and "d" can be set to various values.

As described above, on at least one of the first end side and the second end side, by displacing the bent portions, a portion of the current collector other than the bent portions of the current collector is also exposed. This increases the exposed area of the current collector exposed to the outside. Therefore, the contact area between the first current collector and the first terminal and/or the contact area between the second current collector and the second terminal can be increased, improving the adhesion between the current collector and the terminal.

Such a laminate can be produced by, for example, when folding the electrode group in a zigzag pattern, displacing bent portions gradually in a predetermined direction perpendicular to the thickness direction of the laminate, or allowing every other one of bent portions to protrude in a predetermined direction perpendicular to the thickness direction of the laminate.

Embodiment 3

In the present invention, at least one bent portion located on at least one of the first end side and the second end side of the flat portions may be formed of a separator and a current collector.

Figure 4:
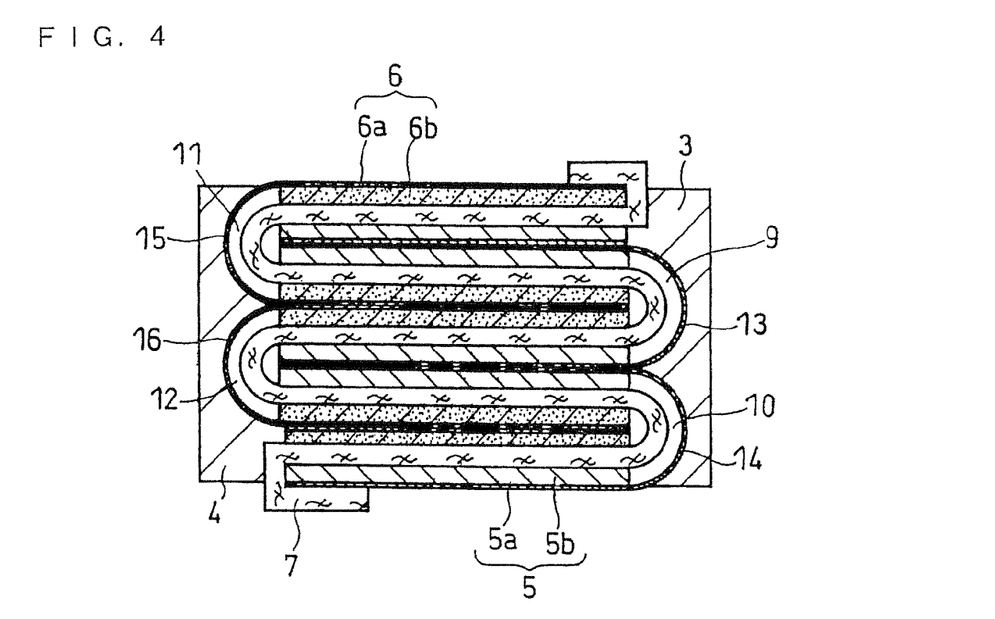
FIG. 4 is a vertical cross sectional view schematically showing a power generating unit included in a battery according to still another embodiment of the present invention.

FIG. 4 shows a power generating unit including a laminate in which all bent portions are formed of a separator and a current collector. In FIG. 4, the same reference numerals are given to the same components as those of FIG. 1.

As shown in FIG. 4, bent portions 9 and 10 located on the first end side are formed of a separator 7 and a first current collector 5a. Similarly, bent portions 11 and 12 located on the second end side are formed of the separator 7 and a second current collector 6a. As just described, because the current collectors have no active material layer on the bent portions, the bent portions are thin. For this reason, the bent portions will not be thick, so it is possible to allow the laminate to have a uniform thickness.

Further, it is also possible to form surface irregularities in a predetermined pattern (not shown) in the current collector that forms bent portions. By forming irregularities in a predetermined pattern on the surface of the current collector that forms bent portions, the surface area of the current collector is increased, increasing the contact area between the current collector and the terminal. Accordingly, the adhesion between the current collector that forms bent portions and the terminal can be improved.

The pattern of the surface irregularities formed in the current collector may be any pattern as long as the surface area of the current collector can be increased.

It is also possible that, in Embodiments 1 and 2, the bent portions are formed of a separator and a current collector. It is also possible to form the bent portions with a separator and a current collector and, at the same time, to form surface irregularities in a predetermined pattern in the current collector that forms the bent portions.

The laminate as shown in FIG. 4 can be produced as follows, for example.

First and second electrodes including current collectors having a portion in which no active material layer is formed are produced. The first and second electrodes are laminated with a separator interposed therebetween to produce an electrode group. The electrode group is then folded in a zigzag manner such that the portion of the current collector in which no active material layer is formed is located in bent portions. Thereby, the laminate as shown in FIG. 4 can be produced.

Embodiment 4

At least one of the first electrode and the second electrode may be formed of a plurality of electrode plates, each including a current collector and an active material layer carried on one surface of the current collector.

Figure 5:
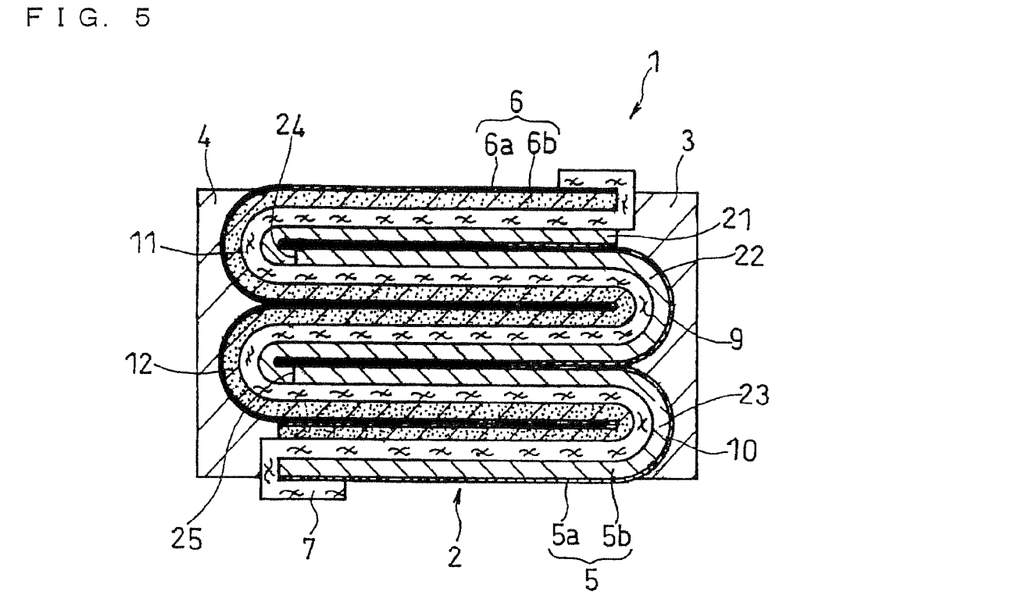
FIG. 5 is a vertical cross sectional view schematically showing a power generating unit included in a battery according to still another embodiment of the present invention.

FIG. 5 shows a power generating unit whose first electrode is formed of a plurality of electrode plates. In FIG. 5, the same reference numerals are given to the same components as those of FIG. 1.

In the laminate included in the power generating unit of FIG. 5, the first electrode is formed of three electrode plates 21 to 23. Each electrode plate includes a current collector 5a and an active material layer 5b carried on one surface of the current collector 5a.

The laminate of FIG. 5 is formed by folding, in a zigzag pattern, an electrode group including the first electrode, a second electrode, and a separator interposed therebetween. In the formed laminate, one end portion of the electrode plate 21 and one end portion of the electrode plate 22 are in contact with each other at the position 24. The other end portion of the electrode plate 22 and one end portion of the electrode plate 23 are in contact with each other at the position 25. Even when the first electrode is formed of three electrode plates as just described, the first current collector 5a can be provided on the outermost side of the first bent portions 9 and 10. The position at which the end portions of the electrode plates are in contact may be anywhere such as flat portion, bent portion or the like.

In this embodiment, both the first electrode and the second electrode may be formed of a plurality of electrode plates, or either one of the first electrode and the second electrode may be formed of a plurality of electrode plates.

Alternatively, at least one of the first electrode and the second electrode may be formed of a plurality of electrode plates and a strip-shaped conductive material for connecting the electrode plates. It is preferable that the strip-shaped conductive material is located in the bent portions in the formed laminate. Thereby, the bent portions contain no active material layer, and therefore similarly to Embodiment 3 given above, it is possible to form a laminate having a uniform thickness.

It is also possible that, in Embodiments 1 to 3, at least one of the first electrode and the second electrode is formed of a plurality of electrode plates.

The present invention will be described by way of examples. It is to be understood that the present invention is not limited to the examples given below.

EXAMPLE 1

(Battery 1)

A battery having a power generating unit as shown in FIG. 1 was produced. In this example, the first electrode served as a positive electrode, and the second electrode served as a negative electrode.

(Production of positive electrode)

An aluminum metal was deposited onto the surface of a release agent-coated polyethylene terephthalate (PET) film to which a release agent had been applied, so as to form a positive electrode current collector (thickness: 2 μm) made of an aluminum foil.

Subsequently, a positive electrode material mixture paste was prepared by mixing $LiCoO_2$ serving as a positive electrode active material, polyvinylidene fluoride (PVDF) serving as a binder, and N-methyl-2-pyrrolidone (NMP) at a predetermined ratio. The obtained paste was applied onto a surface of the positive electrode current collector opposite to the surface thereof on which the PET film was present such that the thickness would be about 100 μm, followed by drying to form a positive electrode active material layer. The release agent-coated PET film was then separated from the positive electrode current collector. Thereby, a positive electrode was obtained.

(Production of negative electrode)

Copper was deposited onto a release agent-coated PET film to form a negative electrode current collector (thickness: 2 μm) made of a copper foil.

Subsequently, a negative electrode material mixture paste was prepared by mixing mesocarbon microbeans (MCMB) (available from Mitsubishi Chemical Corporation) serving as a negative electrode active material, PVDF and NMP at a predetermined ratio. The obtained paste was applied onto a surface of the negative electrode current collector opposite to the surface thereof on which the PET film was present such that the thickness would be about 140 μm, followed by drying to form a negative electrode active material layer. The release agent-coated PET film was then separated from the negative electrode current collector. Thereby, a negative electrode was obtained.

(Production of Laminate)

The positive and negative electrodes thus obtained were laminated with a 20 μm thick separator made of a polyethylene microporous film interposed therebetween to obtain an electrode group in the form of a film having a thickness of about 260 μm. The positive electrode, the separator and the negative electrode were laminated such that the positive electrode active material layer and the negative electrode active material layer faced each other with the separator interposed therebetween.

Subsequently, the obtained electrode group was folded four times in a zigzag pattern to obtain a laminate as shown in FIG. 1. The laminate had a thickness of 1.3 mm. When the laminate was viewed from the above in the thickness direction of the laminate, the width of the laminate was 35 mm (the same width as that of the electrode group), and the length of the laminate in a predetermined direction perpendicular to the width direction was 30 mm.

(Formation of positive electrode terminal and negative electrode terminal)

A positive electrode terminal made of aluminum was formed over the entire first end face of the laminate where first bent portions were provided. Thereby, the positive electrode terminal was connected to all of the first bent portions. Likewise, a negative electrode terminal made of copper was formed over the entire second end face where second bent portions were provided. Thereby, the negative electrode terminal was connected to all of the second bent portions. The positive electrode terminal and the negative electrode terminal had a thickness of 500 μm.

The formation of the positive electrode terminal and the negative electrode terminal was performed by arc spraying using a thermal spraying apparatus (EAS-WD-I available from Coaken Techno Co. Ltd.). The conditions for thermal spraying of aluminum were set to as follows: current value of 50 A, voltage of 28 V, spray distance of 150 mm, main air pressure of 4.0 $kgf/cm^2$, and sub-air pressure of 4.5 $kgf/cm^2$. The conditions for thermal spraying of copper were set to as follows: current value of 40 A, voltage of 48 V, spray distance of 150 mm, main air pressure of 4.0 $kgf/cm^2$, and sub-air pressure of 4.5 $kgf/cm^2$.

Thereby, a power generating unit as shown in FIG. 1 was produced.

To the positive electrode terminal and the negative electrode terminal, a positive electrode lead and a negative electrode lead were attached, respectively.

Subsequently, the laminate of the obtained power generating unit was impregnated with an electrolyte. As the electrolyte, a non-aqueous electrolyte prepared by dissolving $LiPF_6$ in a mixed solvent of ethylene carbonate and diethyl carbonate mixed at a volume ratio of 1:1 at a $LiPF_6$ concentration of 1 mol/L was used.

The power generating unit whose laminate was impregnated with the electrolyte was housed in a battery case. The positive electrode lead and the negative electrode lead were drawn to the outside, and the opening of the battery case was sealed to obtain Battery 1. As the battery case, a bag made of an aluminum laminate sheet (available from Dai Nippon Printing Co., Ltd.) was used.

(Battery 2)

Battery 2 was produced in the same manner as Battery was produced, except that a power generating unit as shown in FIG. 2 was used. In the power generating unit of Battery 2, "a" was set to 20 mm, "b" and "c" were set to 10 mm, and "d" was set to 15 mm.

(Battery 3)

Battery 3 was produced in the same manner as Battery was produced, except that a power generating unit as shown in FIG. 3 was used. In the power generating unit of Battery 3, "a" and "b" were set to 15 mm, and "c" was set to 25 mm.

(Battery 4)

Battery 4 was produced in the same manner as Battery 1 was produced, except that a power generating unit as shown in FIG. 4 was used. In the power generating unit of Battery 4, irregularities were formed on the surface of the current collector that formed first bent portions and that of the current collector that formed second bent portions.

(Comparative Battery 1)

For comparison, a battery as shown in FIG. 7 was produced. The laminate used for Comparative Battery 1 was the same one as used in Battery 1.

A positive electrode current collector 52 was exposed at the undersurface of the laminate 51, and a conductive plate member 62 made of aluminum was disposed such that it was in contact with the positive electrode current collector 52. A negative electrode current collector 55 was exposed at the upper surface of the laminate 51, and a conductive plate member 63 made of copper was disposed such that it was in contact with the negative electrode current collector 55. The other surfaces of the laminate 61 except for the upper surface and the undersurface were covered with an electrically insulating sealant 61. Thereby, Comparative Battery 1 was obtained.

The conductive plate member 62 being in contact with the positive electrode current collector functions as a positive electrode terminal. The conductive plate member 63 being in contact with the negative electrode current collector functions as a negative electrode terminal. In other words, in Comparative Battery 1, the terminals are provided on the top and bottom of the laminate.

(Evaluation)

Batteries 1 to 4 and Comparative Battery 1 were evaluated as follows. In the following evaluation test, the number of batteries used for each Battery was five.

First, initial battery capacity was measured as follows.

Each battery was charged at a current value of 60 mA until the battery voltage reached 4.2 V, after which the battery was charged at a constant voltage of 4.2 V for a predetermined period of time. Subsequently, the charged battery was discharged at a constant current of 60 mA until the battery voltage decreased to 3.0 V so as to determine the initial battery capacity. As a result, Batteries 1 to 4 and Comparative Battery 1 had almost the same initial battery capacity, namely, approximately 300 mAh.

Figure 8:
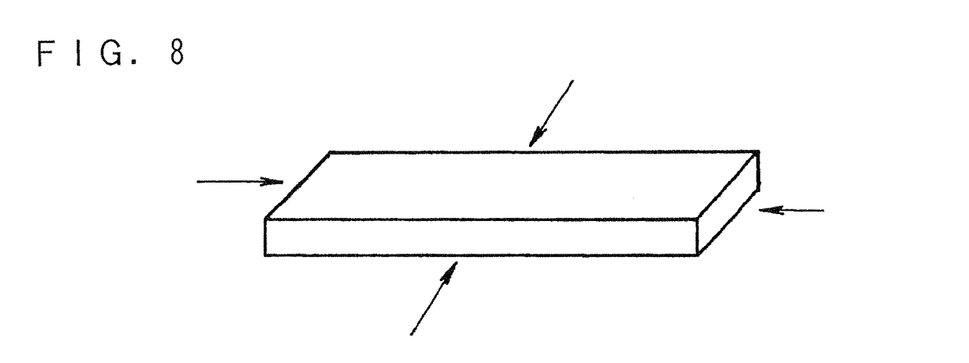
FIG. 8 is a diagram showing four surfaces serving as a bottom surface that lands on a plate in a drop test.

The battery was then subjected to a drop test. In the drop test, the battery was dropped five times from a height of 75 cm onto a plate such that each of the four surfaces indicated by arrows in FIG. 8 landed on the plate.

After the drop test, the battery capacity was again measured in the same manner as described above. Table 1 shows the number of batteries whose measured capacity was almost the same as the initial battery capacity.

TABLE 1

|  | Battery 1 | Battery 2 | Battery 3 | Battery 4 | Comp. Battery 1 |
| --- | --- | --- | --- | --- | --- |
| Number of normal batteries | 5 | 5 | 5 | 5 | 0 |

As shown in Table 1, the capacities of Batteries 1 to 4 decreased very little even after the drop test. In contrast, as for Comparative Battery 1, the capacities of all the batteries decreased to 0 mAh.

Each battery was disassembled after drop test, and the cross section of the power generating unit was observed through an optical microscope. As a result, in the batteries of Comparative Battery 1, the terminals were completely separated from the current collectors. As for the batteries of Battery 1, part of the terminals provided on the side faces of the laminate was separated from the current collectors. On the other hand, in the batteries of Batteries 2 to 4, both the positive and negative electrode terminals were not separated at all from the positive and negative electrode current collectors.

The result of Battery 1 indicates that even when part of the terminals is separated from the current collectors, it is possible to collect current from the terminals. Because the first terminal and the second terminal are formed over the entire first end face and the entire second end face, respectively, even if part of the terminals is separated from the current collectors, the remaining part is in contact with the current collectors, so it is possible to collect current from the terminals.

Further, in Batteries 1 to 4, the positive electrode terminal and the negative electrode terminal are formed on the first end face and the second end face, respectively, by thermal spraying. Presumably, this increased the adhesion strength between the terminals and the current collectors as compared to that of Comparative Battery 1, which made it difficult for the terminals to separate from the current collectors.

INDUSTRIAL APPLICABILITY

The battery of the present invention has terminals on the side faces, and is useful as a thin battery or the like. Because the battery of the present invention is highly resistant to, for example, external impacts, it can be used as a power source for mobile devices and the like which require impact resistance.

The invention claimed is:

1. A battery comprising a strip shaped electrode group,
said electrode group comprising a first electrode, a second electrode, and a separator interposed therebetween,
said first electrode having a strip shaped first current collector and a first active material layer carried on one surface of the first current collector, said first active material layer facing said separator,
said second electrode having a strip shaped second current collector and a second active material layer carried on one surface of the second current collector, said second active material layer facing said separator, wherein:
said electrode group is folded in a zigzag pattern to form a laminate having a plurality of flat portions, a plurality of first bent portions located on a first end side of said plurality of flat portions in which said first current collector is located on the outermost side, and a plurality of second bent portions located on a second end side that is opposite to said first end side in which said second current collector is located on the outermost side,
on at least one of said first end side and said second end side, said bent portions are displaced gradually in one direction from one endmost bent portion on one side toward the other endmost bent portion on the other side, in a predetermined direction perpendicular to the thickness direction of said laminate and said first current collector and said second current collector are exposed to said first end side and said second end side, respectively, and
said laminate has a first terminal covering said first current collector exposed to said first end side, and a second terminal covering said second current collector exposed to said second end side.

2. A battery comprising a strip shaped electrode group,
said electrode group comprising a first electrode, a second electrode, and a separator interposed therebetween,
said first electrode having a strip shaped second current collector and a second active material layer carried on one surface of the second current collector, said second active material layer facing said separator,
said second electrode having a strip shaped first current collector and a first active material layer carried on one surface of the first current collector, said first active material layer facing said separator, wherein:
said electrode group is folded in a zigzag pattern to form a laminate having a plurality of flat portions, a plurality of first bent portions located on a first end side of said plurality of flat portions in which said first current collector is located on the outermost side, and a plurality of second bent portions located on a second end side that is opposite to said first end side in which said second current collector is located on the outermost side,
on at least one of said first end side and said second end side, bent portions are displaced alternately in one direction and in the opposite direction from one endmost bent portion on one side toward the other endmost bent portion on the other side, in a predetermined direction perpendicular to the thickness direction of said laminate, and said first current collector and said second current collector exposed to said first end side and said second end side, respectively, and
said laminate has a first terminal covering said first current collector exposed to said first end side, and a second terminal covering said second current collector exposed to said second end side.

3. The battery in accordance with claim 1, wherein, in at least one of said first bent portions and said second bent portions, said current collector does not carry said active material layer.

4. The battery in accordance with claim 1, wherein, in at least one of said first bent portions and said second bent portions, irregularities are formed on the surface of said current collector.

5. The battery in accordance with claim 2, wherein, in at least one of said first bent portions and said second bent portions, said current collector does not carry said active material layer.

6. The battery in accordance with claim 2, wherein, in at least one of said first bent portions and said second bent portions, irregularities are formed on the surface of said current collector.

* * * * *

UNITED STATES PATENT AND TRADEMARK OFFICE
CERTIFICATE OF CORRECTION

PATENT NO. : 7,794,873 B2  
APPLICATION NO. : 11/910603  
DATED : September 14, 2010  
INVENTOR(S) : Shinji Mino et al.

It is certified that error appears in the above-identified patent and that said Letters Patent is hereby corrected as shown below:

Claim 1, column 13, line 26, of the Letters Patent which issued on September 14, 2010 incorrectly reads:

"ness direction of said laminate and said first current"

and should read:

"ness direction of said laminate, and said first current"

Claim 2, column 13, lines 37-39, of the Letters Patent which issued on September 14, 2010 incorrectly reads:

"said first electrode having a strip shaped second current collector and a second active material layer carried on one surface of the second current collector, said second"

and should read:

"said first electrode having a strip shaped first current collector and a first active material layer carried on one surface of the first current collector, said first"

Claim 2, column 13, lines 41-42 through claim 2, column 14, line 1, of the Letters Patent which issued on September 14, 2010, incorrectly reads:

"said second electrode having a strip shaped first current collector and a first active material layer carried on one surface of the first current collector, said first active"

and should read:

"said second electrode having a strip shaped second current collector and a second active material Signed and Sealed this  
Seventh Day of June, 2011

David J. Kappos  
*Director of the United States Patent and Trademark Office*

CERTIFICATE OF CORRECTION (continued)
U.S. Pat. No. 7,794,873 B2 layer carried on one surface of the second current collector, said second active"